United States Patent Office 3,634,348
Patented Jan. 11, 1972

3,634,348
ELECTRODEPOSITABLE PHOSPHATE ESTER-POLYEPOXIDE EMULSIONS
Melvin K. Carter, Moraga, Calif., assignor to Shell Oil Company, New York, N.Y.
No Drawing. Filed May 9, 1969, Ser. No. 823,487
Int. Cl. C09d 3/58, 5/24; C23b 13/00
U.S. Cl. 260—18 EP                                         11 Claims

ABSTRACT OF THE DISCLOSURE

The disclosure describes an electrodepositable emulsion which forms a film whose thickness is substantially independent of the applied potential or pH of the emulsion bath comprising a major amount of polyepoxide and a minor amount of a phosphate ester emulsifying agent.

---

The present invention relates to emulsions suitable for use in electrodeposition. More particularly, the present invention relates to phosphate ester-polyepoxide emulsions.

Electrodeposition, namely the electrocoating of an anode in an electrical circuit comprising a bath of aqueous medium in electric contact with an anode and cathode, is well known. In the past the aqueous medium has generally been a soluble system where relatively low molecular weight polymers or resins are made water soluble by introduction of carboxylic groups. The present invention is directed towards emulsion systems rather than soluble systems. These emulsion systems rely on organic surfactant molecules for both dispersion and transportation in the aqueous medium.

Among the problems associated with electrodeposition are the following: (1) poor corrosion resistance of the electrodeposited film; (2) undesirable pH change of the aqueous bath during electrodeposition causing changes in film thickness and film composition; and (3) variation in film thickness with variation in voltage applied.

The present invention relates to the discovery of an electrodepositable aqueous emulsion comprising a major amount of a polyepoxide and a minor amount of a phosphate ester emulsifying agent which emulsion forms a corrosion resistant film whose thickness and composition are substantially independent of the applied voltage and whose pH remains constant during a substantial portion of electrodeposition.

EMULSION CONSTITUENTS—POLYEPOXIDES

The polyepoxides to be used in preparing the aqueous emulsions of the present invention are described in substantial detail in U.S. Pat. No. 2,956,034 to Simpson. Briefly, they comprise the organic compounds possessing more than one vicinal epoxy group, i.e., more than one

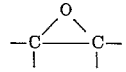

group, per molecule. These compounds may be saturated or unsaturated, aliphatic, cycloaliphatic, aromatic or heterocyclic and may be substituted with substituents such as chlorine, hydroxyl groups, ether radicals and the like. They may be monomeric or polymeric.

For clarity, many of the polyepoxides and particularly those of the polymeric type are described in terms of "epoxy equivalent" values. This expression refers to the average of the number of epoxy groups per molecule. The epoxy equivalent value is obtained by dividing the average molecular weight of the polyepoxide by the epoxide equivalent weight. The epoxide equivalent weight is determined by heating a sample of the polyepoxide with an excess of pyridinium chloride dissolved in pyridine at the boiling point and then back-titrating the excess pyridinium chloride with 0.1 N sodium hydroxide to the phenolphthalein end point. The epoxide value is calculated by considering one HCl as equivalent to one epoxide group. This method is used to obtain epoxide equivalent values referred to herein.

If the polyepoxide material is a single compound having all of the epoxy groups intact, the epoxy equivalent value will be an integer. In the case of polymeric polyepoxides the material may contain some of the monomeric epoxide or have some of the epoxy groups hydrated or otherwise reacted and/or contain macromolecules of various molecular weights. In this case the epoxy equivalent may be a fractional value and may be only slightly higher than 1. Another suitable description of the epoxide content of an epoxy compound is in terms of epoxy equivalent per 100 grams.

Detailed discussion of polyepoxides suitable for use in this invention is found in the Simpson patent and in U.S. Pat. No. 2,633,458 to Shokal. So much of the disclosures of the Shokal patent as is relative to examples of polyepoxide is incorporated by reference into this specification.

Suitable monomeric polyepoxide compounds include diepoxidized alkadienes, diepoxidized alkenylcylohexenes, diglycidyl ethers of dihydroxy aromatics and other polyglycidyl ethers of polyhydroxy aromatics, halo-substituted derivatives of such compounds, diepoxy ethers and the like.

Suitable polyepoxides further include the epoxidized esters of polyethylenically unsaturated monocarboxylic acids, such as epoxidized natural poly-unsaturated oils. Another group is the epoxidized esters of unsaturated monohydric alcohols and polycarboxylic acids. Another group is the epoxidized esters of unsaturated alcohols and unsaturated carboxylic acids. Another group is the epoxidized derivatives of polyethylenically unsaturated polycarboxylic acids. Another group is the epoxidized polyesters obtained by reaction of an unsaturated polyhydric alcohol and/or unsaturated polycarboxylic acid or anhydride. Another group is the glycidyl esters of polymerized unsaturated long-chain acids, such as dimer acids and trimer acids described hereinafter. Another group is the glycidyl esters of polybasic acids such as o-phthalic acid.

Examples of the polymeric polyepoxides suitable for use in the invention include the polyepoxypolyhydroxy polyethers obtained by reacting a polyhydric alcohol or polyhydric phenol with polyepoxide.

Other polymeric polyepoxide compounds include the polymers and copolymers of the epoxy containing monomers possessing at least one polymerizable ethylenic linkage. When this type of monomer is polymerized in the substantial absence of alkaline or acidic catalyst such as in the presence of heat, oxygen, peroxy compounds, actinic light and the like, it undergoes additional polymerization at the multiple bond leaving the epoxy group unaffected. These monomers may be polymerized with themselves or with other ethylenically unsaturated monomers.

The polyepoxides that are particularly preferred for use in the compositions of this invention are the polyglycidyl ethers and particularly the polyglycidyl polyethers of polyhydric phenols and those of polyhydric alcohols. The polyglycidyl ethers of polyhydric phenols can be obtained by reacting a polyhydric phenol with an excess, e.g., 4 to 10 mole excess, of a halogen-containing epoxide in an alkaline medium.

Epihalohydrin, particularly epichlorohydrin is usually preferred as the halogen-containing epoxide. The halogen-containing epoxides are further exemplified by epibromohydrin, 3-chloro-1,2-epoxybutane, 3-bromo-1,3-epoxyhexane, 3-chloro-1,2-epoxyoctane and the like.

Polyethers A through E of Shokal, U.S. 2,633,458, are good examples of polyepoxides of the preferred type. Polyether A which contains a major proportion of 2,2-bis (2,3-epoxypropoxyphenyl)propane, is obtained by reacting p,p'-bisphenol A [2,2-bis(4-hydroxyphenyl)propane] with an excess of epichlorohydrin. Other polyhydric phenols that can be used for this purpose include resorcinol, catechol, hydroquinone, methyl resorcinol and polynuclear phenols such as 2,2-bis(hydroxyphenyl) butane, 4,4'-dihydrobenzophenone, bis(4-hydroxyphenyl) ethane and 1,5-dihydroxynaphthalene. Polyether F of the Shokal patent is a glycidyl polyether of a polyhydric alcohol. Other suitable ethers are the polyglycidyl ethers of tetrakis(hydroxyphenyl)alkanes.

The Simpson and Shokal patents contain a large number of illustrative individual compounds of the above described general types of suitable polyepoxides.

Other polyepoxide compositions which may be used in the present invention are the reaction product of polyepoxides, as described above, and unsaturated fatty acids such as linseed oil, tall oil and other drying and semi-drying oil fatty acids. These products are more fully described in U.S. Pat. No. 2,786,773 to Bradley and so much of the disclosure of the Bradley patent as is relative to examples of polyepoxide-fatty acid reaction products is incorporated by reference into this specification.

EMULSIFYING AGENTS

The emulsifying agents or surfactants to be used in the present invention are surfactants which contain organic phosphate esters including complex organic orthophosphate or polyphosphate esters acids and their salts. Preferred phosphate ester emulsifying agents are complex co-esters comprising the salt of an orthophosphate or polyphosphate ester of an alcohol and an adduct of ethylene oxide. The salt may be sodium or potassium and the alcohol may be aliphatic or aromatic. The preferred alcohol is octyl alcohol.

In addition to aqueous bath may contain suitable pigments, stabilizers, extenders and other conventional additives which result in desired film properties.

CURING AGENTS

The compositions of the invention may be cured by the action of a curing or hardening agent. For this purpose, epoxy curing agents, which may be acidic neutral, or alkaline are added. Examples of the curing agents include, among other alkalies like sodium or potassium hydroxide; alkali phenoxides like sodium phenoxide; carboxylic acids or anhydrides, such as phthalic anhydride, tetrahydrophthalic anhydride; dimer or trimer acids derived from unsaturated fatty acids, 1,20-eicosanedioic acid, and the like. Friedel-Crafts metal halides, such as aluminum chloride, zinc chloride, ferric chloride; salts such as zinc fluoborate, magnesium perchlorate, zinc fluosilicate; phosphoric acid and partial esters thereof including n-butyl ortho-phosphate, diethyl ortho-phosphate and hexaethyltetraphosphate; amino compounds, such as for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-diethyloctane, dibutylamine, dioctylamine, dionylamine, distearylamine, diallylamine, dicyclohexylamine, methylethylamine, ethylcyclohexylamine, pyrrolidine, 2-methylpyrrolidine, tetrahydropyridine, 2,6-diaminopyridine, metaphenylene diamine, and the like, and soluble adducts of amines and polyepoxides and their salts, such as described in U.S. 2,651,589 and in U.S. 2,640,037. Also included are the amino-amides obtained by reacting polybasic acids with polyamines.

Preferred curing agents are the polycarboxylic acids and their anhydrides the primary and secondary aliphatic, cycloaliphatic, aromatic and heterocyclic amines, and preferably the polyamines and adducts of amines and epoxides.

The amount of the curing agent employed will vary depending upon the type of agent selected. In general, the amount of the curing agent will vary from about 0.5% to 200% by weight of the polyepoxide. The tertiary amines or $BF_3$ complexes are preferably employed in amounts varying from about 0.5% to 20% and the metal salts are preferably employed in amounts varying about 1% to 15%. The secondary and primary amines, acids and anhydrides are preferably employed in at least 0.6 equivalent, an equivalent amount being that sufficient to furnish one active hydrogen atom or carboxyl group or anhydride group for every epoxy group. Such combinations are preferably combined in equivalent ratios (curing agent to epoxy) which vary from about 0.6:1 to 1.5:1.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed cure. Temperatures employed will vary from about 30° C. to as high or higher than 250° C.

The emulsions described above form excellent coatings by the process of electrodeposition. This process relates to the electrocoating of an anode in electric contact with a cathode, both anode and cathode being in a bath containing the aqueous emulsion. The source of potential may be alternating current, direct current, or combinations thereof and the current may be continuous or pulsating, though continuous direct current is preferred. The potential may vary between 5 and 750 volts, the upper limit relating to the potential at which the film formed on the anode ruptures. The preferred potential is a potential between about 250 and 450 volts. The time used for electrodeposition varies with the emulsion used, the thickness of the film that is desired and the potential applied. Generally, this is from a few seconds to several minutes for films of less than about 2 mils. The anode may be any conductive material. The cathode is generally lead or steel.

The present invention may be further described and illustrated with reference to the following examples. It is to be understood that the examples are for the purpose of illustration and the invention is not to be regarded as limited to any of the specific compounds or conditions recited therein.

EXAMPLE I.—PREPARATION

An emulsion was prepared by combining a glycidyl ether of 2,2-bis(4-hydroxyphenyl)propane having an average molecular weight of approximately 350 and an epoxide equivalent weight of 180–190, which has been 50% esterified with tall oil fatty acid (by reacting the glycidyl ether and fatty acid together in the presence of heat) with a 35% tetrasodium salt of N-(1,2-dicarboxyethyl-N-octadecylsulfosuccinamate) as follows: 25.0 g. of the ester was dissolved in 100 ml. benzene and 200 ml. acetone at 40° C. Cobalt naphthenate, 0.02 g. of a 6% solution, was added to the ester. The ester solution was then emulsified in 500 ml. of room temperature deionized, distilled water containing 0.25 g. of the surfactant in a high shear mixer until an emulsion temperature of 40° C. was attained. All of the solvent was removed under reduced pressure at 30° C.

Electrodeposition

A 250 volt D-C power supply was used. The depositions were carried out at constant voltage using Bonderized steel panels for anodes and a lead or steel cathode. The pH was adjusted to the desired value (7.28) prior to the deposition. The panels were coated for from 10-30 seconds. The panels were then removed from the bath, rinsed with distilled water, dried and baked for ½ hour at 150-175° C. (At room temperature, cure results in about 5 days.) During the curing step the deposited film is crosslinked via the unsaturation in the tall oil ester. The cobalt naphthenate accelerates this cure.

The resulting films coated poorly, had uneven coverage and poor corrosion resistance. Furthermore, during the electrodepositions, as the bath was depleted, the pH of the bath varied substantially, e.g., initial pH 7.28, after 37% depletion, pH 10.0. In addition, further tests showed the above emulsion yielded films whose thicknesses were strongly dependent on the applied potential.

EXAMPLE II

A number of other emulsions were made and tested as shown in Example I except that the following cationic and anionic emulsifiers were used in place of emulsifier used in Example I.

(1) 90% alkyl aryl sulfonate, e.g., Solar 90BD.
(2) 58% $NH_4^+$ salt of a $SO_4^-$ ester of an alkylphenoxy-poly(ethyleneoxy)ethanol.
(3) Diglycol laurate.
(4) Nonionic $RNH(CH_2CH_2O)_5H$.
(5) Fatty alcohol amine sulfate, e.g., Duponol OS.
(6) Fatty amine complex, non hydrolyzing emulsifier, e.g. Catimuls.
(7) 20% octyldimethyl amine oxide.
(8) Tetradecylpyridinium bromide.

(9) 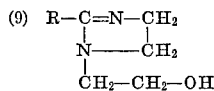

where R=oleic.

(10) Polyoxyethylated alkylamine, e.g., Katapol PN 430.
(11) Blend of fatty acid esters and polyglycols with complex amine bases, e.g., Mulsor K-487.
(12) N,N - bis(2-hydroxyethyl)-N,coco - 1,3-(diaminopropane).
(13) Dialkyl aminoalkyl fatty acid amide tertiary amine, e.g., Togamine O-13.
(14) Ethylene oxide condensates of primary fatty amines, e.g., Trylox TA-2.

All the emulsifiers described in Example II produced films with substantially all of the defects of the films (and electrocoating bath) of Example I.

EXAMPLE III

A 5% emulsion of the polyepoxide ester described in Example I containing 1% of a complex co-ester surfactant, the sodium salt of an orthophosphate or polyphosphate ester of octyl alcohol and a nonionic adduct of ethylene oxide, was prepared and electrodeposited as described in Example I.

The resultant film formed a hard coating having good coverage and excellent corrosion resistance. In addition, during electrodeposition, as the bath was depleted of the first 30% of the solids, the pH did not vary more than ±0.10 unit.

In addition, the effects of voltage on film thickness at constant pH (7.2±0.1) was determined. Table I tabulates the results for the emulsion of Example III.

TABLE I

| Potential (volts): | Film thickness (mils) |
|---|---|
| 50 | 0.12 |
| 100 | 0.35 |
| 150 | 0.62 |
| 200 | 1.0 |
| 250 | 1.25 |
| 300 | 1.25 |
| 350 | 1.25 |
| 400 | 1.35 |
| 450 | 1.39 |
| 500 | 1.78 |
| 550 | 1.85 |

The effect of voltage on film thickness at constant pH is apparent. Between 250 and 450 volts (the usual range for electrodeposition) the thickness is nearly independent of voltage and varies between 1.2 and 1.4 mils.

In addition the effects of pH change on film thickness was determined. Table II below tabulates the results for the emulsion of Example III.

TABLE II

| pH | Potential (volts) | Film thickness (mils) |
|---|---|---|
| 6.7 | 150 | 0.65 |
| 8.0 | 150 | 0.65 |
| 8.5 | 150 | 0.60 |
| 9.0 | 150 | 0.55 |
| 6.7 | 250 | 1.00 |
| 8.0 | 250 | 1.00 |
| 8.5 | 250 | 1.00 |
| 9.0 | 250 | 0.95 |

The effect of variable pH on film thickness at constant voltage is also apparent. At 150 volts the film thickness remains essentially constant (0.60±0.05 mils) and at 250 volts the film thickness remains essentially constant (0.97±0.03 mils) with pH variation of from 6.7 to 9.

EXAMPLE IV

Two emulsions were prepared the first containing the polyepoxide ester used in Example I and 1% of a phosphate ester which is the reaction product of phosphorous pentoxide (1 mol), ethylene oxide (9 mol) and nonyl phenol (3 mol) and the second containing the polyepoxide ester used in Example I and 1% of a phosphate ester which is the reaction product of phosphorous pentoxide (1 mol), ethylene oxide (6 mol) and nonyl phenol (2 mol).

Results comparable with the results of Example III are achieved when the emulsions of Example IV are tested as in Example III.

EXAMPLE V

Emulsions of a diglycidyl ether of 2,2-bis(4-hydroxyphenyl)propane having an average molecular weight of approximately 470 and an epoxide equivalent weight of 230-280 with the surfactants used in Example III and Example IV are prepared and electrodeposited as described in Example I with the exception that methyl triphenyl phosphonium iodide (0.1%) was used (as a curing agent) in place of the cobalt naphthenate accelerator.

Results comparable with the results of Examples III and IV are achieved.

EXAMPLE VI

Emulsions of the polyepoxide used in Example V and the emulsifiers used in Example II are prepared and electrodeposited as described in Example I with the exception that 0.1% methyl triphenyl phosphonium iodide was used (as a curing agent) in place of the cobalt naphthenate accelerator.

Results comparable with the results of Example I are achieved.

I claim as my invention:

1. An electrodepositable aqueous emulsion comprising a major amount of a polyepoxide and an emulsifying amount of an emulsifying agent which is a complex co-ester comprising a sodium or potassium salt of an orthophosphate or polyphosphate ester of an alcohol and an adduct of ethylene oxide.

2. A composition as in claim 1 wherein the polyepoxide is a diglycidyl ether of 2,2-bis(4-hydroxyphenyl)propane.

3. A composition as in claim 2 wherein the diglycidyl ether is about 50% esterified with an unsaturated fatty acid.

4. A composition as in claim 3 wherein the fatty acid is tall oil fatty acid.

5. A composition as in claim 1 wherein the salt is selected from the group consisting of the sodium salt and the potassium salt and the alcohol is octyl alcohol.

6. A composition as in claim 5 wherein the polyepoxide is a diglycidyl ether of 2,2-bis(4-hydroxyphenyl)propane which has been 50% esterified with tall oil fatty acid.

7. An aqueous emulsion electrodeposition process for depositing on an anode a corrosion resistant polyepoxide film, whose thickness and composition are substantially independent of the applied voltage and whose pH remains constant during a substantial portion of the electrodeposition, comprising electrocoating the anode in electric contact with a cathode, both anode and cathode being in a bath containing an aqueous emulsion comprising a major amount of a polyepoxide and an emulsifying amount of an emulsifying agent which is a complex co-ester comprising a sodium or potassium salt of an orthophosphate or polyphosphate ester of an alcohol and an adduct of ethylene oxide.

8. A process as in claim 7 wherein the polyepoxide is a diglycidyl ether of 2,2-bis(4-hydroxyphenyl)propane.

9. A process as in claim 8 wherein the diglycidyl ether is about 50% esterified with an unsaturated fatty acid.

10. A process as in claim 9 wherein the fatty acid is tall oil fatty acid.

11. A process as in claim 7 wherein the alcohol is octyl alcohol.

References Cited

UNITED STATES PATENTS

| 2,633,458 | 3/1953 | Shokal | 260—18 |
| 2,786,773 | 3/1957 | Bradley | 106—123 |
| 2,956,034 | 10/1960 | Simpson | 260—18 |
| 3,314,912 | 4/1967 | Bean et al. | 260—30.6 |
| 3,417,164 | 12/1968 | Patton et al. | 260—30.6 |
| 3,455,805 | 7/1969 | Smith et al. | 204—181 |
| 3,468,779 | 9/1969 | Slater et al. | 204—181 |
| 3,502,557 | 3/1970 | Yurcheshen et al. | 204—181 |

DONALD E. CZAJA, Primary Examiner

R. W. GRIFFIN, Assistant Examiner

U.S. Cl. X.R.

204—181; 260—29.2 EP, 30.6 R